(12) United States Patent  (10) Patent No.: US 7,177,759 B2
Nakamura  (45) Date of Patent: Feb. 13, 2007

(54) CONTROL APPARATUS AND METHOD FOR INTERNAL COMBUSTION ENGINE

(75) Inventor: Munenori Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/345,228

(22) Filed: Feb. 2, 2006

(65) Prior Publication Data

US 2006/0178803 A1 Aug. 10, 2006

(30) Foreign Application Priority Data

Feb. 4, 2005 (JP) ............................. 2005-029471

(51) Int. Cl.
G06F 19/00 (2006.01)
F02D 45/00 (2006.01)
G06F 17/00 (2006.01)

(52) U.S. Cl. .................. 701/114; 701/105; 123/478

(58) Field of Classification Search ................ 701/114, 701/105, 110, 115, 102; 123/478, 480, 479
See application file for complete search history.

(56) References Cited

U.S. PATENT DOCUMENTS 4,502,446 A * 3/1985 Kanegae et al. ............ 123/479

FOREIGN PATENT DOCUMENTS

JP A-2000-104619 4/2000
JP A-2004-150397 5/2004

* cited by examiner

Primary Examiner—Hieu T. Vo
(74) Attorney, Agent, or Firm—Oliff & Berridge, PLC

(57) ABSTRACT

A control apparatus for an internal combustion engine includes a crankshaft, a camshaft for actuating an intake valve of the engine, a crank position sensor that outputs a crank signal every time the crankshaft rotates 10° of crank angle, an electric motor that is coupled to the camshaft, and an engine control computer that, based on the crank signal, controls the engine every time the crankshaft rotates 30° of crank angle. The motor includes a rotor and three rotation sensors. Each sensor outputs a signal corresponding to induced voltage generated by rotation of the rotor. The computer controls the rotating motor based on the signals from the rotation sensors. When the crank position sensor malfunctions, the computer controls the engine every time the crankshaft rotates 30° of crank angle based not on the crank signal but on a rotation pulse train generated based on the signals from the rotation sensors.

15 Claims, 8 Drawing Sheets

CONTROL APPARATUS AND METHOD FOR INTERNAL COMBUSTION ENGINE

BACKGROUND OF THE INVENTION

The present invention relates to a control apparatus and a method for an internal combustion engine.

A typical internal combustion engine such as an automobile engine has a crank position sensor that outputs a crank signal every time the engine output shaft, or the crankshaft, rotates a predetermined crank angle, for example, 10° CA. Based on the crank signal from the crank position sensor, control processes for operating the engine such as a fuel injection control and an ignition timing control are executed every time the crankshaft rotates, for example, 30° CA.

When the fuel injection control and the ignition timing control are executed, a cylinder in which fuel injection and ignition should be executed must be distinguished. Accordingly, a process for distinguishing cylinders needs to be executed. To execute such a cylinder distinguishing control, a typical internal combustion engine is provided with a cam position sensor that outputs a cam signal every time a camshaft rotates predetermined degrees. The cylinder distinguishing control is executed based on the cam signal from the cam position sensor and the crank signal from the crank position sensor.

Such a cam signal is used for detecting the valve timing in a case where the engine is provided with a variable valve timing mechanism that varies the valve timing of engine valves. A variable valve timing mechanism changes the relative rotation phase between a camshaft and the crankshaft, thereby varying the valve timing of the engine valves. Based on a cam signal and a crank signal as described above, the relative rotational phase of the camshaft, or the current valve timing of the engine valves, is detected.

The output intervals of the cam signal from the cam position sensor are normally set longer than the output intervals of the crank signal. This is because the cam signal is used only for distinguishing the cylinders and detecting the relative rotational phase of the camshaft, and does not need to be outputted at a short interval such as 10° CA like the crank signal from the crank position sensor.

When there is an abnormality such as a broken wire in the crank position sensor, the control processes for controlling the operation of the engine such as the fuel injection control and the ignition timing control cannot be executed every 30° CA based on the crank signal from the crank position sensor. Such a problem can be avoided by providing two or more crank position sensors. That is, when one of the sensors malfunctions, the control processes are executed based on a normal crank signal outputted by another sensor. However, providing two or more crank position sensors is impractical since it increases costs and troubles.

Instead of the previous configuration, a configuration may be adopted in which, if a crank position sensor malfunctions, the control processes are executed based on the cam signal from the cam position sensor instead of the crank signal. That is, the already existing cam position sensor is used for executing the control processes when the crank position sensor malfunctions. Therefore, unlike the case in which an auxiliary crank position sensor is provided, costs and troubles are not increased.

However, the output intervals of the cam signal from the cam position sensor are longer than those of the crank signal from the crank position sensor. It is therefore necessary to take a countermeasure as described, for example, in Japanese Laid-Open Patent Publication No. 2000-104619. Specifically, during the period from an output of a cam signal to the subsequent output of the cam signal, pseudo execution timing for the control processes is generated, and the control processes are executed according to the pseudo execution timing. The pseudo execution timing is generated in the following manner. That is, after the cam signal is outputted at predetermined timing, a time interval at which the control processes should be executed (a time interval corresponding to 30° of crank angle) is computed based on the interval between the last output of the cam signal and the last output but one. The pseudo execution timing is generated every time the computed time interval elapses. In this manner, since the pseudo execution timing is generated and the control processes are executed according to the pseudo execution timing, so that the processes can be executed even in the period from an output of the cam signal to the subsequent output of the cam signal.

However, if the rotation speed of the crankshaft (camshaft) abruptly changes due to acceleration or deceleration of the engine during the period from an output of the cam signal to the subsequent output of the cam signal, the generated pseudo execution timing will be inappropriate. The pseudo execution timing is generated at an interval corresponding to 30° of crank angle, which is obtained based on the interval between the last output of the cam signal and the last output but one. When the rotation speed of the camshaft changes abruptly, the interval between the last output of the cam signal and the last output but one will be inappropriate for computing the interval corresponding to 30° of crank angle.

To cope with this problem, Japanese Laid-Open Patent Publication No. 2000-104619 proposes that the generated pseudo execution timing be corrected in accordance with the degree of acceleration and deceleration of the engine. However, the rotation speed of a camshaft changes in a number of manners according to the conditions. It is thus unlikely that the pseudo execution timing is maintained appropriate by the correction process shown above despite such various types of changes in the camshaft rotation speed.

SUMMARY OF THE INVENTION

Accordingly, it is an objective of the present invention to provide a control apparatus for an internal combustion engine that, when a crank position sensor malfunctions, executes control processes for controlling the engine at appropriate timing despite abrupt changes in the engine rotation speed.

To achieve the foregoing and other objectives and in accordance with the purpose of the present invention, a control apparatus for an internal combustion engine is provided. The engine includes a crankshaft, a camshaft for actuating a valve of the engine, a crank position sensor that outputs a crank signal every time the crankshaft rotates a predetermined crank angle, a rotating electrical machine that is coupled to one of the crankshaft and the camshaft, and a computer that, based on the crank signal from the crank position sensor, controls the engine every time the crankshaft rotates a predetermined crank angle. The rotating electrical machine includes a rotor and a plurality of rotation sensors. Each sensor outputs a signal corresponding to induced voltage generated by rotation of the rotor. The computer controls the rotating electrical machine based on the signals from the rotation sensors. When the crank position sensor malfunctions, the computer controls the engine every time the crankshaft rotates a predetermined crank angle based not on the crank signal but on a rotation pulse train generated based on the signals from the rotation sensors.

The present invention provides another control apparatus for an internal combustion engine. The engine includes a crankshaft, a camshaft for actuating a valve of the engine, a crank position sensor that outputs a crank signal every time the crankshaft rotates a predetermined crank angle, a rotating electrical machine that is coupled to one of the crankshaft and the camshaft, and a computer that, based on the crank signal from the crank position sensor, controls the engine every time the crankshaft rotates a predetermined crank angle. The rotating electrical machine includes a rotor and a plurality of rotation sensors. Each sensor outputs a signal corresponding to induced voltage generated by rotation of the rotor. The computer controls the rotating electrical machine based on signals from the rotation sensors. When the crank position sensor malfunctions, the computer executes an emergency operation of the engine based on a rotation pulse train generated based on the signals from the rotation sensors.

Further, the present invention provides a method for controlling an internal combustion engine. The engine has a crankshaft, a camshaft for actuating a valve of the engine, a rotating electrical machine that is coupled to one of the crankshaft and the camshaft. The method includes: outputting a crank signal from a crank position sensor every time the crankshaft rotates a predetermined crank angle; controlling the engine based on the crank signal from the crank position sensor at every predetermined crank angle; outputting, from a plurality of rotation sensors, signals corresponding to induced voltage generated by rotation of a rotor of the rotating electrical machine; controlling the rotating electrical machine based on the signals from the rotation sensors; and controlling, when the crank position sensor malfunctions, the engine at every predetermined crank angle based not on the crank signal but on a rotation pulse train generated based on the signals from the rotation sensors.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of the present invention applied to an automobile multi-cylinder engine 1 will now be described with reference to FIGS. 1 to 7.

Figure 1:
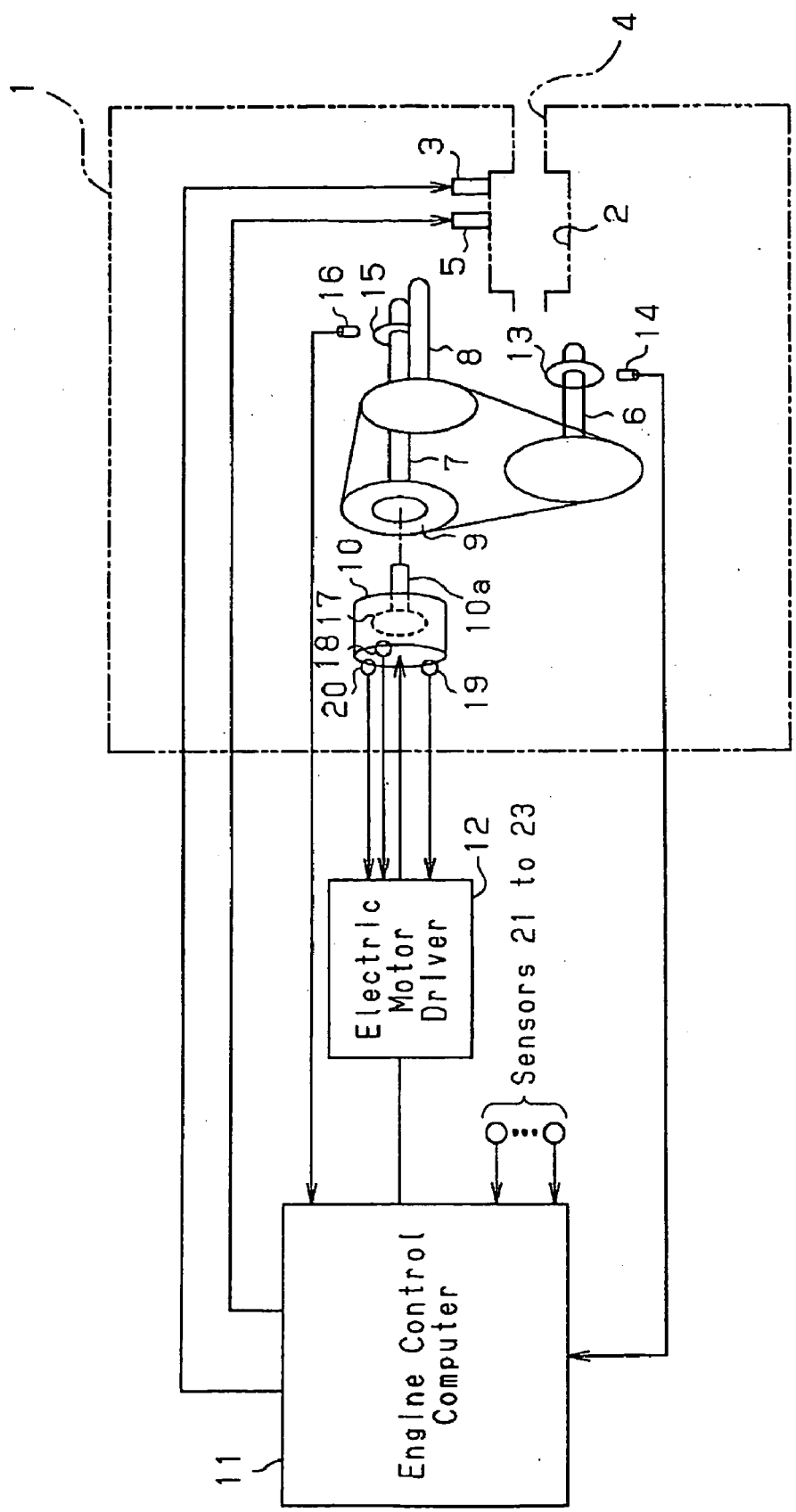
FIG. 1 is a diagrammatic view illustrating an entire engine to which a control apparatus according to a first embodiment is applied.

As shown in FIG. 1, the engine 1 has cylinders and combustion chambers 2 (only one is shown). Each combustion chamber 2 is defined in one of the cylinders. The engine 1 also has fuel injection valves 3, ignition plugs 5, intake valves, and exhaust valves, each corresponding to one of the combustion chambers 2. In the following, only one set of a combustion chamber 2, an injection valve 3, an ignition plug 5, an intake valve, and an exhaust valve will mainly be discussed as representing all the combustion chambers 2, the injection valves 3, the ignition plugs 5, the intake valves, and the exhaust valves.

The fuel injection valve 3 injects fuel into the combustion chamber 2, and air is drawn into the combustion chamber 2 form an intake passage 4. The air-fuel mixture is ignited by the ignition plug 5. When such ignition of air-fuel mixture occurs so that the air-fuel mixture is burned, the combustion energy drives engine 1, in other words, rotates a crankshaft 6.

Rotation of the crankshaft 6 is transmitted to an intake camshaft 7 and an exhaust camshaft 8. The rotation transmitted from the crankshaft 6 causes the camshafts 7, 8 to rotate 360° per 720° rotation of the crankshaft 6. The rotation of the intake camshaft 7 and the exhaust camshaft 8 open and close an intake valve and an exhaust valve of the engine 1.

The intake camshaft 7 is provided with a variable valve timing mechanism 9. The variable valve timing mechanism 9 changes the rotational phase of the intake camshaft 7 relative to the crankshaft 6, thereby advancing or retarding the valve timing of the intake valve. The variable valve timing mechanism 9 is an electric type having an electric motor 10. The electric motor 10 has an output shaft 10*a* coupled to the intake camshaft 7. The electric motor 10 is controlled to change the rotational phase of the intake camshaft 7 relative to the crankshaft 6. The electric motor 10 is a three-phase alternating current motor that includes an excitation coil wound about a rotor 17 coupled to the output shaft 10*a*, and armature coils for U-phase, V-phase, and W-phase wound about a stator (not shown). The output shaft 10*a* of the electric motor 10 is coupled to and integrally rotates with the intake camshaft 7.

The rotation speed of the output shaft 10*a* is increased or decreased by controlling the electric motor 10. When the rotation speed of the output shaft 10*a* is set higher than the rotation speed of the intake camshaft 7, the rotation speed of the intake camshaft 7 is increased so that the rotational phase of the intake camshaft 7 is advanced relative to that of the crankshaft 6. As a result, the valve timing of the intake valve is advanced. When the rotation speed of the output shaft 10a is set lower than the rotation speed of the intake camshaft 7, the rotation speed of the intake camshaft 7 is reduced so that the rotational phase of the intake camshaft 7 is retarded relative to that of the crankshaft 6. As a result, the valve timing of the intake valve is retarded.

Next, a detection device for detecting rotation states of rotary shafts of the engine 1 including the crankshaft 6, the intake camshaft 7, and the output shaft 10a of the electric motor 10 will now be described.

A crank rotor 13 is attached to the crankshaft 6, and a crank position sensor 14 is located in the vicinity of the crank rotor 13. When the crank rotor 13 rotates as the crankshaft 6 rotates, the crank position sensor 14 outputs a crank signal shown in section (a) of FIG. 2. As shown in section (a) of FIG. 2, when the crankshaft 6 rotates, the crank position sensor 14 outputs the crank signal having pulses every time the crank angle advances 10° of crank angle. That is, the shape of the crank rotor 13 and the position of the crank position sensor 14 are determined such that the thus described signal is generated. The crank signal outputted by the crank position sensor 14 is used for obtaining the rotation speed of the engine 1.

A cam rotor 15 is attached to the intake camshaft 7, and a cam position sensor 16 is located in the vicinity of the cam rotor 15. When the cam rotor 15 rotates as the intake camshaft 7 rotates, the cam position sensor 16 outputs a cam signal shown by solid line in section (b) of FIG. 2. As shown in section (b) of FIG. 2, when the intake camshaft 7 rotates, the cam position sensor 16 outputs the cam signal having pulses at 0°, 180°, 360° of crank angle. That is, the shape of the cam rotor 15 and the position of the cam position sensor 16 are determined such that the thus described signal is generated. The cam signal outputted by the cam position sensor 16 is used for distinguishing the cylinders of the engine 1 and detecting the valve timing of the intake valve.

The electric motor 10 has three rotation sensors, or first to third rotation sensors 18 to 20 provided about the rotor 17 attached to the output shaft 10a. When the motor rotor 17 rotates along with rotation of the output shaft 10a, which rotates integrally with the crankshaft 6 and the intake camshaft 7, the first to third rotation sensors 18 to 20 each output a square signal corresponding to induced voltage generated by the rotation as shown in sections (c) to (e) of FIG. 2. As shown in sections (c) to (e) of FIG. 2, each of the square signals outputted by the first to third rotation sensors 18 to 20 repeats rising edges and falling edges every 90° of crank angle. The square signals are displaced by 60° of crank angle from one another. The signals from the first to third rotation sensors 18 to 20 are used for obtaining the rotation speed and rotational position of the motor 10 (the output shaft 10a) when the motor 10 is controlled for varying the valve timing of the intake valve.

The electric configuration of a control apparatus for the engine 1 will now be described with reference to FIG. 1.

The control apparatus includes an engine control computer 11 that executes control processes for the engine 1 such as a fuel injection control, an ignition timing control, an intake valve timing control. The engine control computer 11 includes a CPU that executes computation processes related to control of the engine 1, a ROM storing programs and data necessary for the controls, a RAM for temporarily storing the computation results of the CPU, and input and output ports for inputting and outputting signals from and to the outside.

As well as the crank position sensor 14 and the cam position sensor 16, various types of sensors are connected to the engine control computer 11. The sensors include:

an accelerator pedal position sensor 21 for detecting the depression degree of an accelerator pedal, which is depressed by a driver of the vehicle;

a throttle position sensor 22 for detecting the open degree of a throttle valve located in the intake passage 4 of the engine 1; and an airflow meter 23 for detecting the flow rate of air drawn into the combustion chamber 2 through the intake passage 4.

The engine control computer 11 is connected to an electric motor driver 12 for driving the electric motor 10. The motor driver 12 is connected to the first to third rotation sensors 18 to 20. The engine control computer 11 outputs signals to the motor driver 12, thereby controlling the electric motor 10. Upon receiving the signals shown in sections (c) to (e) of FIG. 2 from the first to third rotation sensors 18 to 20, the motor driver 12 outputs the signals to the engine control computer 11. Further, the motor driver 12 combines these signals to generate a pulse signal (hereinafter, referred to as rotation pulse train) shown in section (f) of FIG. 2, and outputs the generated rotation pulse train to the engine control computer 11. The rotation pulse train is a square signal the waveform of which contains rising edges and falling edges every time the crank angle advances 30°.

The engine control computer 11 acquires the engine operating state based on detection signals from the above described sensors. According to the acquired engine operating state, the engine control computer 11 operates the fuel injection valve 3, the ignition plug 5, and the electric motor 10, thereby executing the fuel injection control for the fuel injection valve 3, the ignition timing control for the ignition plug 5, and the intake valve timing control. When controlling the electric motor 10 for controlling the intake valve timing, the engine control computer 11, based on the signals from the rotation sensors 18 to 20, and the rotation pulse train from the motor driver 12, acquires the current driving state of the electric motor 10, that is, the rotation speed and the rotational position of the output shaft 10a. The engine control computer 11 drives the electric motor 10 by taking the current driving state into consideration. The current driving state is taken into consideration when driving the electric motor 10 for properly driving the electric motor 10.

Among various types of controls executed for operating the engine 1, control procedures for the fuel injection control and the ignition timing control are executed based on the crank signal from the crank position sensor 14 every time the crankshaft 6 advances a predetermined crank angle degree (in this embodiment, every 30° of CA). Through these processes, fuel injection and ignition are executed for each cylinder of the engine 1. To execute the fuel injection control and the ignition timing control for each cylinder, a cylinder in which fuel injection and ignition should be executed needs to be distinguished. Thus, cylinder distinguishing process is executed based on the crank signal from the crank position sensor 14 and the cam signal from the cam position sensor 16. The crank signal and the cam signal are also used for obtaining the current intake valve timing, in other words, the current rotational phase of the intake camshaft 7 relative to the crankshaft 6.

Figure 3:
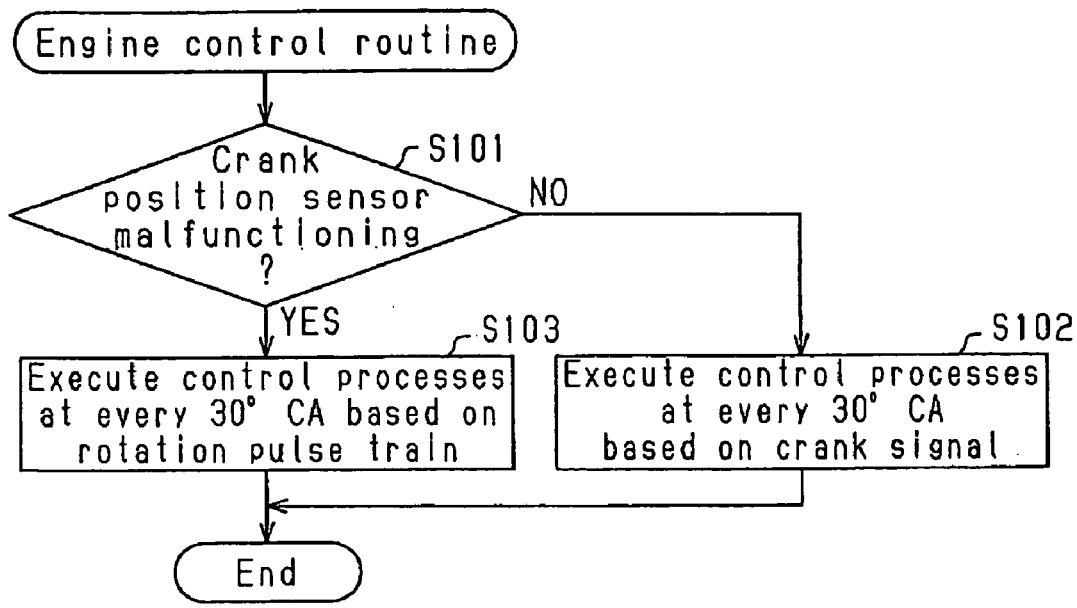
FIG. 3 is a flowchart showing a procedure for executing control processes for controlling the engine.

When there is an abnormality such as a broken wire in the crank position sensor 14, it is impossible to determine whether the crank angle has advanced by 30° based on the crank signal. This hinders execution of the control processes that are executed at every advancement of 30° CA. Hereinafter, procedures for executing the above control processes, as well as countermeasures against the above described problems, will be described with reference to the flowchart of FIG. 3 showing an engine control routine. The engine control routine is executed as an interrupt by the engine control computer 11, for example, at predetermined time intervals.

In the engine control routine, whether the crank position sensor 14 is malfunctioning is determined based on the output state of the crank signal from the crank position sensor 14 (S101). The determination is performed based on, for example, whether the crank signal consists of pulses and whether the variation of the pulse intervals is excessively great. If the crank signal consists of pulses and the pulse interval variation is not excessively great, the crank position sensor 14 is determined not to be malfunctioning (NO at S101). In this case, the above described control processes are executed at every advancement of 30° CA based on the crank signal from the crank position sensor 14 (S102).

If the crank signal does not consist of pulses or if the pulse interval variation is excessively great, the crank position sensor 14 is determined to be malfunctioning (YES at S101). When the crank position sensor 14 is malfunctioning, the above control processes cannot be executed based on the crank signal.

Figure 2:
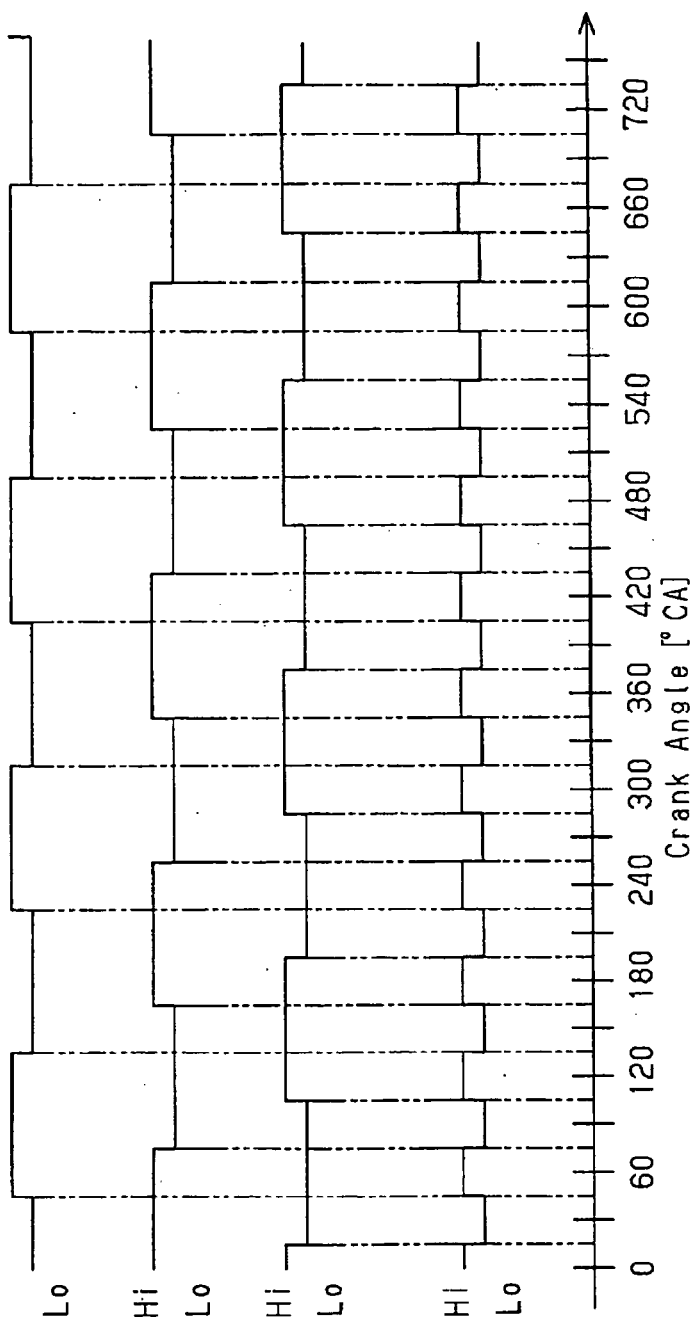
FIG. 2 is a timing chart showing a situation where a crank angle changes, in which section (a) shows a crank signal from a crank position sensor, section (b) shows a cam signal from a cam position sensor, sections (c), (d), and (e) show signals from first to third rotation sensors, and section (f) shows the waveform of a rotation pulse train from a motor driver.

Therefore, it has been proposed that, when the crank position sensor 14 malfunctions, the control processes be executed based on the cam signal from the cam position sensor 16 shown by solid line in section (b) of FIG. 2. However, the cam signal is generated at intervals longer than 300 of crank angle. It is therefore necessary to generate a pseudo signal and execute the control processes based on the pseudo signal. Specifically, during the period from an output of the cam signal to the subsequent output, a time interval corresponding to 30° of crank angle is computed based on the interval of the outputs of the cam signal, and the pseudo signal shown by chain double-dashed line in section (b) of FIG. 2 is generated. This configuration is described in BACKGROUND OF THE INVENTION section.

However, even if the pseudo signal is generated, when the engine rotation speed (the rotation speed of the intake camshaft 7) abruptly changes in the period from an output of the cam signal to the subsequent output, the generation timing of the pseudo signal is displaced from the timing of 30° of crank angle. This is because the pseudo signal is generated at a time interval corresponding to 30° of crank angle obtained based on the output interval of the previous outputs of the cam signal, and the output interval of the previous outputs of the cam signal is inappropriate for computing the time interval corresponding to 30° of crank angle after the rotation speed of the intake camshaft 7 abruptly changes. Alternatively, the generation timing of the pseudo signal may be corrected according to acceleration and deceleration of the engine 1. However, in view of wide variety of changes in the engine rotation speed, it is unlikely that the generation timing of the pseudo signal can be maintained appropriate by such correction.

Accordingly, in this embodiment, when it is determined that the crank position sensor 14 is malfunctioning (YES at S101 in FIG. 3), the control processes are executed at every advancement of 30° CA by using the rotation pulse train outputted by the motor driver 12 as the output shaft 10a of the motor 10, which rotates integrally with the intake camshaft 7, rotates (S103).

Since the intervals at which the rising edges and the falling edges of the rotation pulse train repeat changes in accordance with changes in the rotation speed of the intake camshaft 7 due to changes in the engine rotation speed, the intervals of the rising and falling edges are maintained to intervals at which the control processes should be executed, or the intervals corresponding to the 30° of crank angle, despite abrupt changes in the engine rotation speed. Therefore, the control processes are executed at appropriate timing (every 30° of crank angle) by executing the processes at the timing of the rising and falling edges of the rotation pulse train.

An example of a procedure for executing the fuel injection control, which is one of the controls for operating the engine 1, will now be described with reference to FIGS. 4 and 5.

Figure 5:
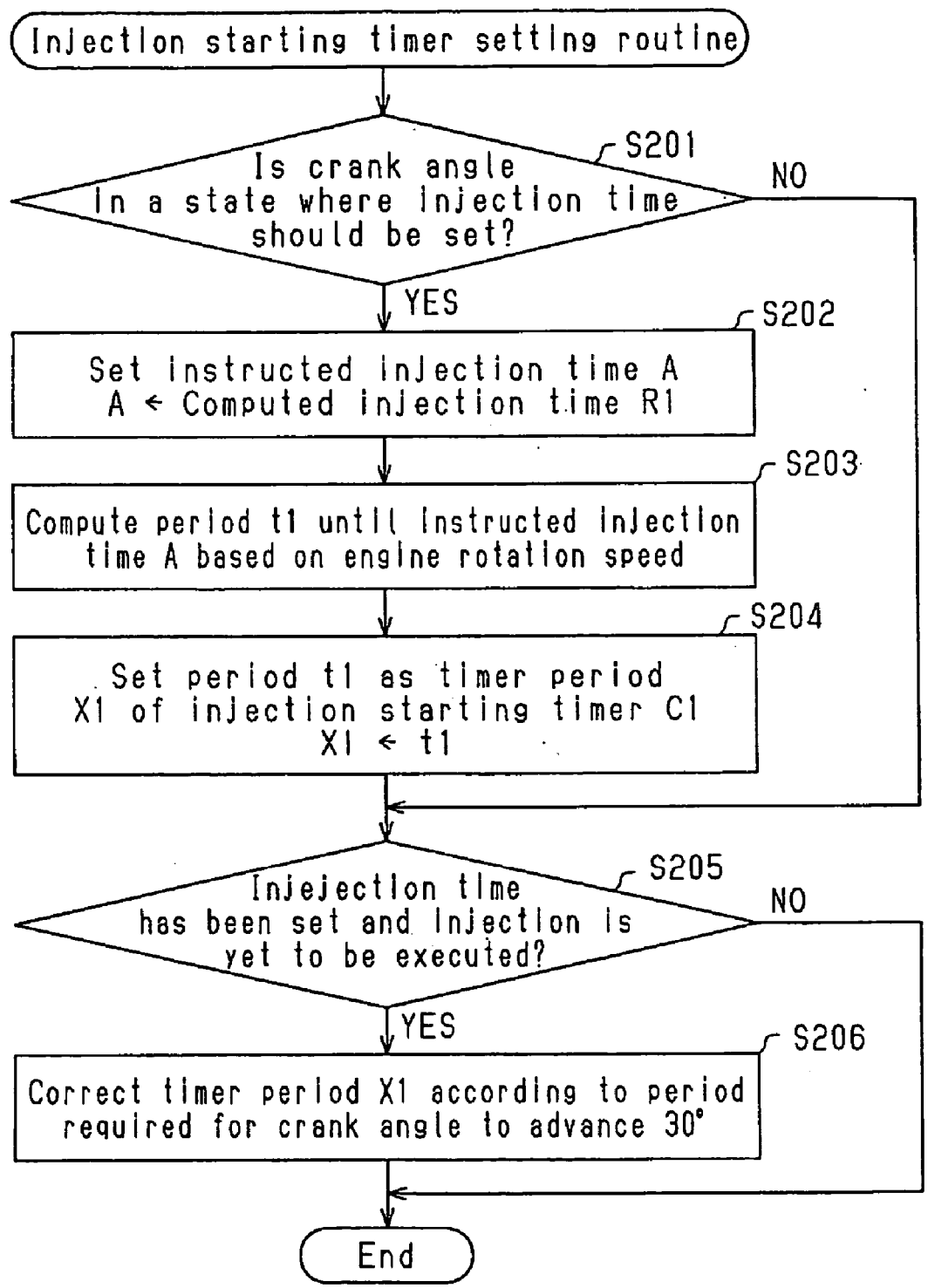
FIG. 5 is a flowchart showing a procedure for setting a timer period of the injection starting timer used in the fuel injection control.

FIG. 5 is a flowchart showing a routine for setting an injection starting timer that is used for setting a timer period of the injection starting timer used for controlling the starting time of the fuel injection from the fuel injection valve 3. The injection starting timer setting routine, which is a control process for the fuel injection control, is executed as an interrupt by the engine control computer 11, for example, every 30° of crank angle. In the normal state of the crank position sensor 14, the execution timing at 30° of crank angle in the injection starting timer setting routine is determined based on the crank signal from the sensor 14. When the crank position sensor 14 malfunctions, the execution timing is determined based on the rotation pulse train from the motor driver 12.

In the injection starting timer setting routine, an injection time setting process is executed (S201, S202). In this process, an instructed injection time A, which is a command value of the fuel injection time, is set at predetermined timing. Specifically, whether the crank angle is in a state where the instructed injection time A should be set, for example, whether the crank angle is 90° before an exhaust top dead center, is determined (S201). If the decision outcome is positive, a computed injection time R1, which has been computed in another routine, is set as the instructed injection time A (S202).

At step S201, the crank angle is obtained based on the crank signal and the cam signal when the crank position sensor 14 is functioning normally. When the crank position sensor 14 is malfunctioning, the crank angle is obtained based on the rotation pulse train and the cam signal. The routine for computing the computed injection time R1 used at step S202 is executed as an interrupt by the engine control computer 11, for example, every 30° of crank angle. In the routine for computing the injection time R1, the engine operating state is acquired based on the detection signals from the various types of sensors. Then, based on the acquired engine operating state, the injection time R1 is computed as fuel injection time suitable for the engine operating state.

After the instructed injection time A is set, a timer setting process (S203, S204) is executed in which the period until the instructed injection time A is computed, and the computed period is set as a timer period of the injection starting timer. Specifically, a crank angle degree corresponding to the difference between the current crank angle and the crank angle corresponding to the instructed injection time A is computed. Then, a period t1 during which the crankshaft 6 rotates the computed crank angle degree is computed based on the engine rotation speed (S203). The engine rotation speed used in this process is obtained based on the crank signal when the crank position sensor 14 is functioning normally. When the crank position sensor 14 is malfunctioning, the engine rotation speed is obtained based on the rotation pulse train from the motor driver 12, instead of the crank signal. Thereafter, the period t1 is set as a timer period X1 of an injection starting timer C1 (S204). The timer period X1 of the injection starting timer C1 is caused to seek zero as time elapses by the engine control computer 11. When the timer period X1 becomes 0, the fuel injection is started through the control of the fuel injection valve 3 executed by the engine control computer 11.

When the timer period X1 of the injection starting timer C1 is set, a timer period correction process (S205, S206) is executed in which the timer period X1 is corrected based on the period required for the crank angle to advance predetermined degrees (engine rotation speed), such that the timer period X1 is maintained appropriate when the engine rotation speed changes. Specifically, whether the instructed injection time A has been set and it is before the execution of fuel injection is determined (S205). If the decision outcome is positive, the timer period X1 is corrected according to the length of the period required for the crank angle to advance, for example, 30° (S206). Through the correction, the timer period X1 is decreased as the period is shortened, and the timer period X1 is increased as the period is extended.

The period required for the crank angle used at step S206 to advance 30° is obtained based on the crank signal from the crank position sensor 14 when the crank position sensor 14 is functioning normally. When the crank position sensor 14 is malfunctioning, the period is obtained based on the rotation pulse train from the motor driver 12, instead of the crank signal. When the crank position sensor 14 malfunctions, if the period is obtained based on the pseudo signal described above, an abrupt change in the engine rotation speed causes the period to be inappropriate as a value corresponding to 30° of crank angle, and the timer period X1, which is corrected based on the period, can be inappropriate. This is because the pseudo signal is generated at a time interval corresponding to 30° of crank angle obtained based on the output interval of the previous outputs of the cam signal, and the output interval of the cam signal of the previous outputs ceases to be a value corresponding to the engine rotation speed after an abrupt change of the engine rotation speed.

However, as for the rotation pulse train from the motor driver 12, which is used for obtaining the period required for the crank angle to advance 30° when the crank position sensor 14 malfunctions, the intervals of the rising edges and the falling edges change in accordance with changes in the engine rotation speed. Therefore, even after an abrupt change in the engine rotation speed, the intervals of the rotation pulse train correspond to the engine rotation speed. The period required for the crank angle to advance 300, which period is obtained based on the rotation pulse train, corresponds to the engine rotation speed after the abrupt change. Therefore, by correcting the timer period X1 based on changes of the period, in other words, based on changes in the intervals of the rotation pulse train, the timer period X1 is maintained appropriate regardless of changes in the engine rotation speed.

Figure 4:
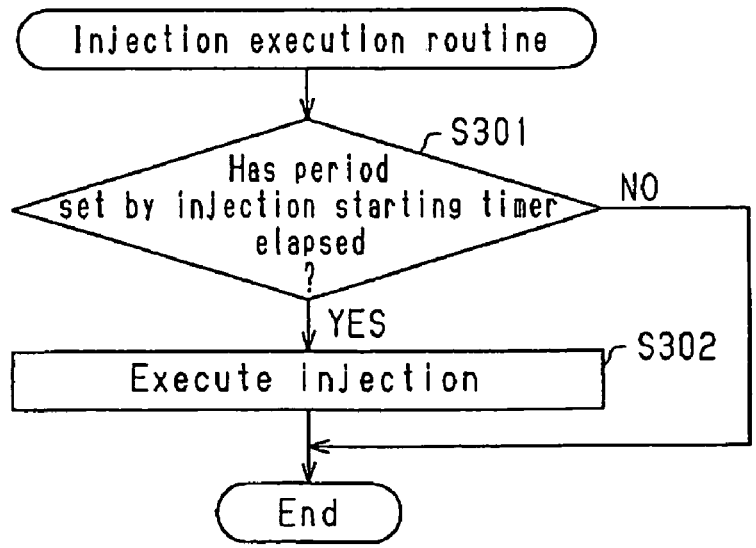
FIG. 4 is a flowchart showing a procedure for executing a fuel injection based on an injection starting timer.

FIG. 4 is a flowchart showing an injection execution routine for executing fuel injection from the fuel injection valve 3. The injection execution routine, which is a control process for the fuel injection control, is executed as an interrupt by the engine control computer 11, for example, at predetermined time intervals (in this embodiment, 16 ms).

In the injection execution routine, an actuation process (S301, S302) is executed in which, when a period set by the injection starting timer C1 has elapsed, the fuel injection valve 3 starts being opened. Specifically, whether the period set by the injection starting timer C1 has elapsed, that is, whether the timer period X1 has become 0, is determined (S301). If the decision outcome is positive, the fuel injection is executed through the control of the fuel injection valve 3 (S302). After the execution of the fuel injection (after the fuel injection is started), when a fuel injection period that has been computed in another routine has elapsed, the fuel injection is stopped through the control of the fuel injection valve 3. The routine for computing the fuel injection period is executed as an interrupt by the engine control computer 11, for example, every 30° of crank angle. In the routine for computing the fuel injection period, the engine operating state is acquired based on the detection signals from the various types of sensors. Then, based on the acquired engine operating state, the fuel injection period suitable for the engine operating state is computed.

An example of a procedure for executing the ignition timing control, which is the one of the controls for operating the engine 1, will now be described with reference to FIGS. 6 and 7.

Figure 6:
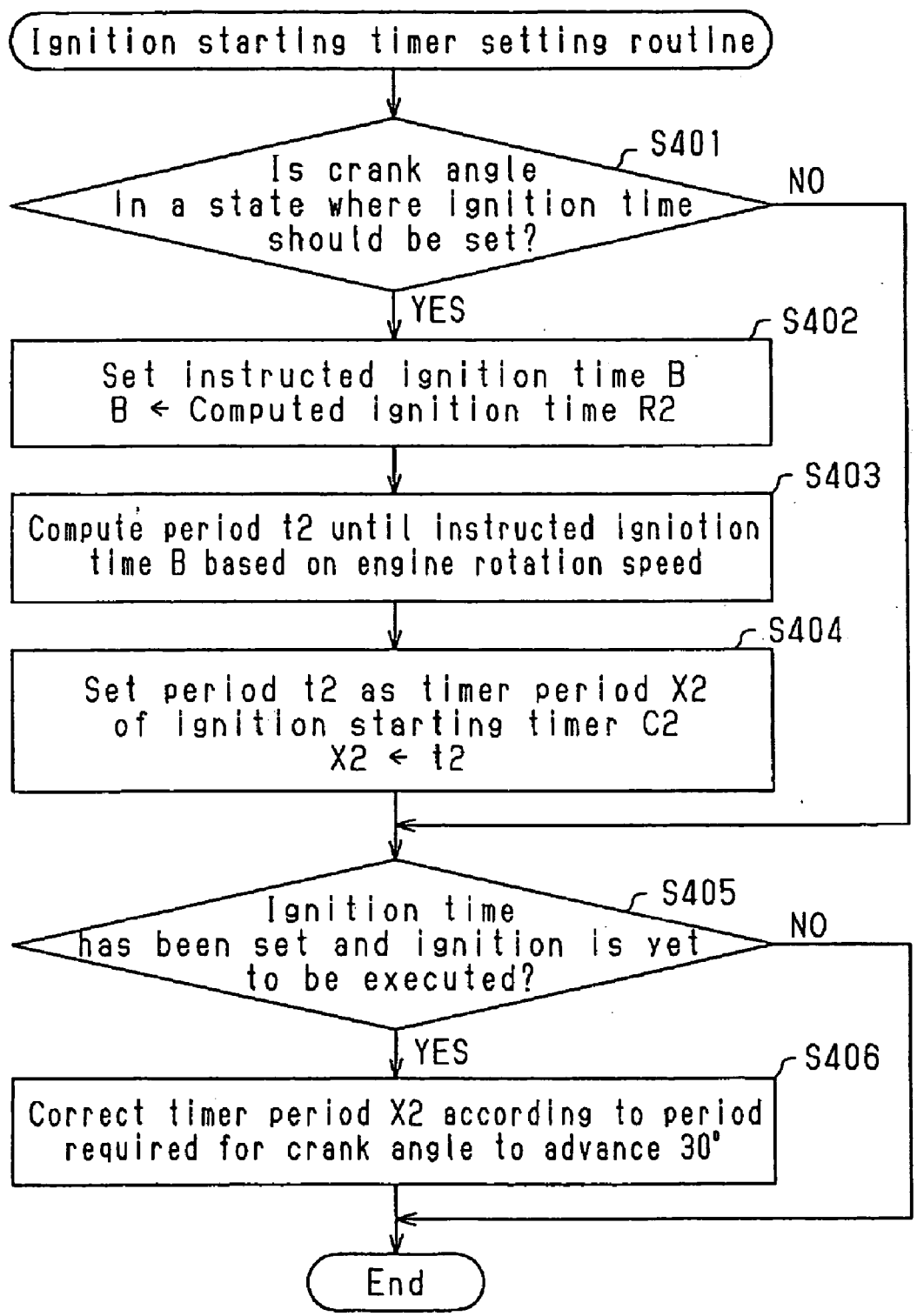
FIG. 6 is a flowchart showing a procedure for setting a timer period of the ignition starting timer used in the ignition timing control.

FIG. 6 is a flowchart showing a routine for setting an ignition starting timer that is used for setting a timer period of an ignition starting timer used for controlling the starting time of the ignition by the ignition plug 5. The ignition starting timer setting routine, which is a control process for the ignition timing control, is executed as an interrupt by the engine control computer 11, for example, every 30° of crank angle. In the normal state of the crank position sensor 14, the execution timing at 30° of the crank angle in the ignition starting timer setting routine is determined based on the crank signal from the sensor 14. When the crank position sensor 14 malfunctions, the execution timing is determined based on the rotation pulse train from the motor driver 12.

In the ignition starting timer setting routine, an ignition time setting process is executed (S401, S402), in which an instructed ignition time B, which is a command value of the ignition time, is set at predetermined timing. Specifically, whether the crank angle is in a state where the instructed ignition time B should be set, for example, whether the crank angle is 90° of the crank angle before an intake top dead center, is determined (S401). If the decision outcome is positive, a computed ignition time R2, which has been computed in another routine, is set as the instructed ignition time B (S402).

At step S401, the crank angle is obtained based on the crank signal and the cam signal when the crank position sensor 14 is functioning normally. When the crank position sensor 14 is malfunctioning, the crank angle is obtained based on the rotation pulse train and the cam signal. The routine for computing the computed ignition time R2 used at step S402 is executed as an interrupt by the engine control computer 11, for example, every 300 rotation of the crank angle. In the routine for computing the computed ignition time R2, the engine operating state is acquired based on the detection signals from the various types of sensors. Then, based on the acquired engine operating state, the computed ignition time R2 is computed as ignition time suitable for the engine operating state.

After the instructed ignition time B is set, a timer setting process (S403, S404) is executed in which the period until the instructed ignition time B is computed, and the period is set as a timer period of the ignition starting timer. Specifically, a crank angle degree corresponding to the difference between the current crank angle and the crank angle corresponding to the instructed ignition time B is computed. Then, a period t2 during which the crankshaft 6 rotates the computed crank angle degree is computed based on the engine rotation speed (S403). The engine rotation speed used in this process is obtained based on the crank signal when the crank position sensor 14 is functioning normally. When the crank position sensor 14 is malfunctioning, the engine rotation speed is obtained based on the rotation pulse train from the motor driver 12, instead of the crank signal. Thereafter, the period t2 is set as timer period X2 of an ignition starting timer C2 (S404). The timer time X2 of the ignition starting timer C2 is caused to seek zero as time elapses by the engine control computer 11. When the timer period X2 becomes 0, the ignition by the ignition plug 5 is started through supply of current to the ignition plug 5 executed by the engine control computer 11.

When the timer period X2 of the ignition starting timer C2 is set, a timer period correction process (S405, S406) is executed in which the timer period X2 is corrected based on the period required for the crank angle to advance predetermined degrees (engine rotation speed), and the timer period X2 is maintained to an appropriate value when the engine rotation speed changes. Specifically, whether the instructed ignition time B has been set and whether it is before the execution of ignition are determined (S405). If the decision outcome is positive, the timer period X2 is corrected according to the length of period required for the crank angle to advance, for example, 300 (S406). Through the correction, the timer time X2 is decreased as the length of period is shortened, and the timer time X2 is increased as the length of period is extended.

The period required for the crank angle used at step S406 to advance 30° is obtained based on the crank signal from the crank position sensor 14 when the crank position sensor 14 is functioning normally. When the crank position sensor 14 is malfunctioning, the period is obtained based on the rotation pulse train from the motor driver 12, instead of the crank signal. The intervals between the rising edges and the falling edges change in accordance with changes in the engine rotation speed as described above. Therefore, even after an abrupt change in the engine rotation speed, the intervals of the rotation pulse train correspond to the engine rotation speed. The period required for the crank angle to advance 30°, which is obtained based on the rotation pulse train, corresponds to the engine rotation speed after the abrupt change. Therefore, when the crank position sensor 14 malfunctions, by correcting the timer period X2 based on changes of the period, in other words, based on changes in the intervals of the rotation pulse train, the timer period X2 is maintained to an appropriate value regardless of changes in the engine rotation speed.

Figure 7:
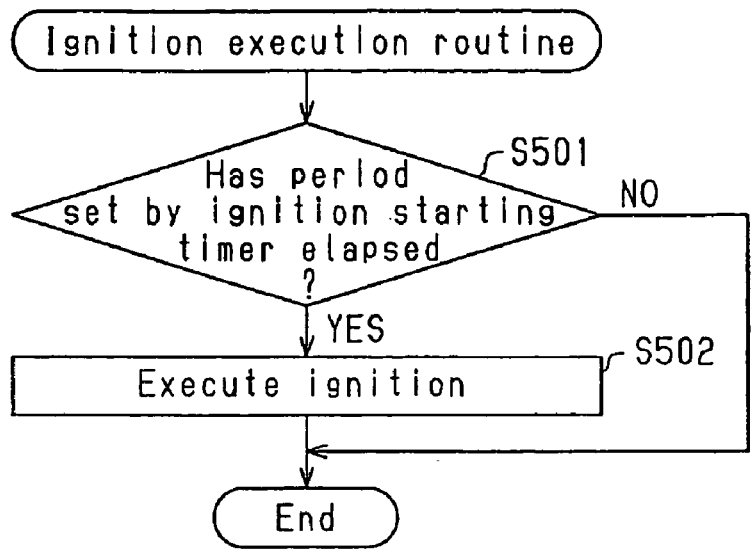
FIG. 7 is a flowchart showing a procedure for executing ignition based on the ignition starting timer.

FIG. 7 is a flowchart showing an ignition execution routine for executing ignition by the ignition plug 5. The ignition execution routine, which is a control process for the ignition control, is executed as an interrupt by the engine control computer 11, for example, at predetermined time intervals (in this embodiment, 16 ms).

In the ignition execution routine, an actuation process (S501, S502) is executed in which, when a period set by the ignition starting timer C2 has elapsed, the supply of current to the ignition plug 5 is started. Specifically, whether the period set by the ignition starting timer C2 has elapsed, that is, whether the timer time X2 has become 0, is determined (S501). If the decision outcome is positive, the ignition by the ignition plug 5 is executed through the supply of current to the ignition plug 5 (S502). After the execution of supply of current to the ignition plug 5 (after the supply of current is started), when a predetermined current supply period has elapsed, the supply of current to the ignition plug 5 is stopped.

The above described embodiment has the following advantages.

(1) When the crank position sensor 14 malfunctions, the fuel injection control and the ignition timing control, which are controls for operating the engine 1, are executed at every advancement of 30° CA using the rotation pulse train, which is outputted from the motor driver 12 as the output shaft 10a of the motor 10 rotates, which output shaft 10a rotates integrally with the intake camshaft 7. Since the intervals at which the rising edges and the falling edges of the rotation pulse train repeat changes in accordance with changes in the rotation speed of the intake camshaft 7 due to changes in the engine rotation speed, the intervals of the rising and falling edges are maintained to intervals at which the control processes should be executed, or the intervals corresponding to the 30° of crank angle, despite abrupt changes in the engine rotation speed. Therefore, the control processes are executed at appropriate timing (every 30° of crank angle) despite abrupt changes in the engine rotation speed by executing the processes at the timing of the rising and falling edges of the rotation pulse train based on the rotation pulse train.

(2) The intervals of the rising edges and the falling edges of the rotation pulse train outputted from the motor driver 12 are the same as the execution intervals of the control processes in the normal state (30° of crank angle). Therefore, when the crank position sensor 14 malfunctions, the control processes for the fuel injection control and the ignition timing control are executed based on the rotation pulse train, so that the control processes can be executed in the same manner as in the normal state.

(3) The rotation pulse train is generated based on signals from the first to third rotation sensors 18 to 20 located in the electric motor 10 that drives the variable valve timing mechanism 9. The rotation sensors 18 to 20 are provided for controlling the electric motor 10 for executing the intake valve timing control. Since the rotation pulse train is generated by the conventional first to third rotation sensors 18 to 20 in the above described manner, no additional sensors need to be provided for generating the rotation pulse train. The costs and troubles accompanying additional sensors are avoided.

(4) In the timer setting process in the control process for the fuel injection control and in the timer setting process for the ignition timing control, the timer period X1 of the injection starting timer C1 and the timer period X2 of the ignition starting timer C2 are set. After the timer periods X1, X2 are set, if the engine rotation speed abruptly changes, the timer periods X1, X2 can have inappropriate values. Therefore, to maintain the timer period X1, X2 to an appropriate value when the engine rotation speed changes, the timer period correction process for correcting the timer periods X1, X2 is executed based on the period required for the crank angle to advance 30°. When the crank position sensor 14 malfunctions, if the period required for the crank angle to advance 30° is obtained based on the pseudo signal, an abrupt change of the engine rotation speed causes the period to be inappropriate as a value corresponding to the 30° of crank angle. However, the period is obtained based on the rotation pulse train from the motor driver 12 when the crank position sensor 14 malfunctions. The intervals of the rotation pulse trains correspond to the engine rotation speed even after such an abrupt change in the engine rotation speed.

Therefore, by correcting the timer periods X1, X2 based on changes of the period obtained based on the rotation pulse train, the timer periods X1, X2 are maintained to appropriate values regardless of changes in the engine rotation speed.

Second Embodiment

A second embodiment of this invention will now be described referring to FIGS. 8 through 10.

In this embodiment, an emergency operation of the engine 1 is performed as a control process for controlling the engine 1 based on the rotation pulse train from the motor driver 12 when the crank position sensor 14 malfunctions.

Figure 8:
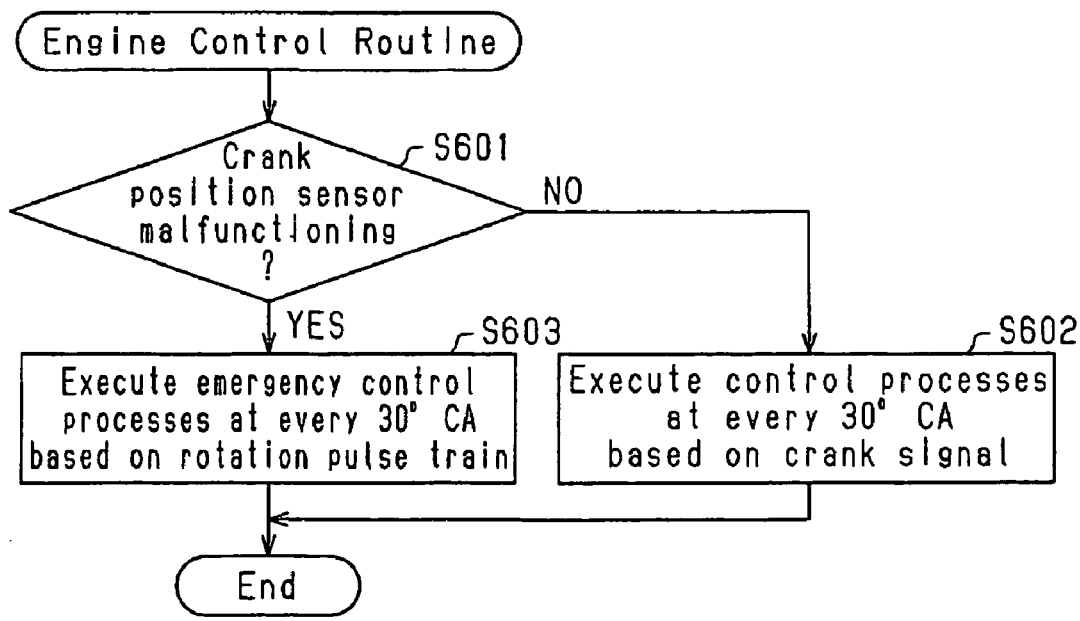
FIG. 8 is a flowchart showing a procedure for executing control processes for controlling an engine according to a second embodiment.

FIG. 8 is a flowchart illustrating an engine control routine according to this embodiment. The engine control routine is executed as an interrupt by the engine control computer 11, for example, at predetermined time intervals.

In the engine control routine, if it is determined that the crank position sensor 14 is not malfunctioning (NO at S601), the control process for controlling the normally functioning engine 1 is executed using the crank angle signal from the crank position sensor 14 at every advancement of 30° CA (S602). As such a normal control, the control process for the fuel injection control based on the flowcharts shown in FIGS. 4 and 5, and the control process for the ignition timing control based on the flowcharts of FIGS. 6 and 7 are executed.

On the other hand, if the crank position sensor 14 is determined to be malfunctioning (YES at S601), the emergency control process for the engine 1 is executed based on the rotation pulse train from the motor driver 12. Such emergency control processes include a control process for the fuel injection control for the emergency operation and a control process for the ignition timing control for the emergency operation. The emergency control processes are also executed at appropriate timing (every 30° of crank angle), despite abrupt changes in the engine rotation speed, by executing the processes at the timing of the rising and falling edges of the rotation pulse train based on the rotation pulse train.

An example of the procedure of the fuel injection control for the emergency operation will now be described with reference to FIG. 9. The fuel injection control for the emergency operation is executed at predetermined timing in each cycle of the engine 1, for example, every time the crank angle advances 720° after the first fuel injection at the exhaust top dead center, so that a sufficient amount of fuel for the emergency operation is injected at the exhaust top dead center.

Figure 9:
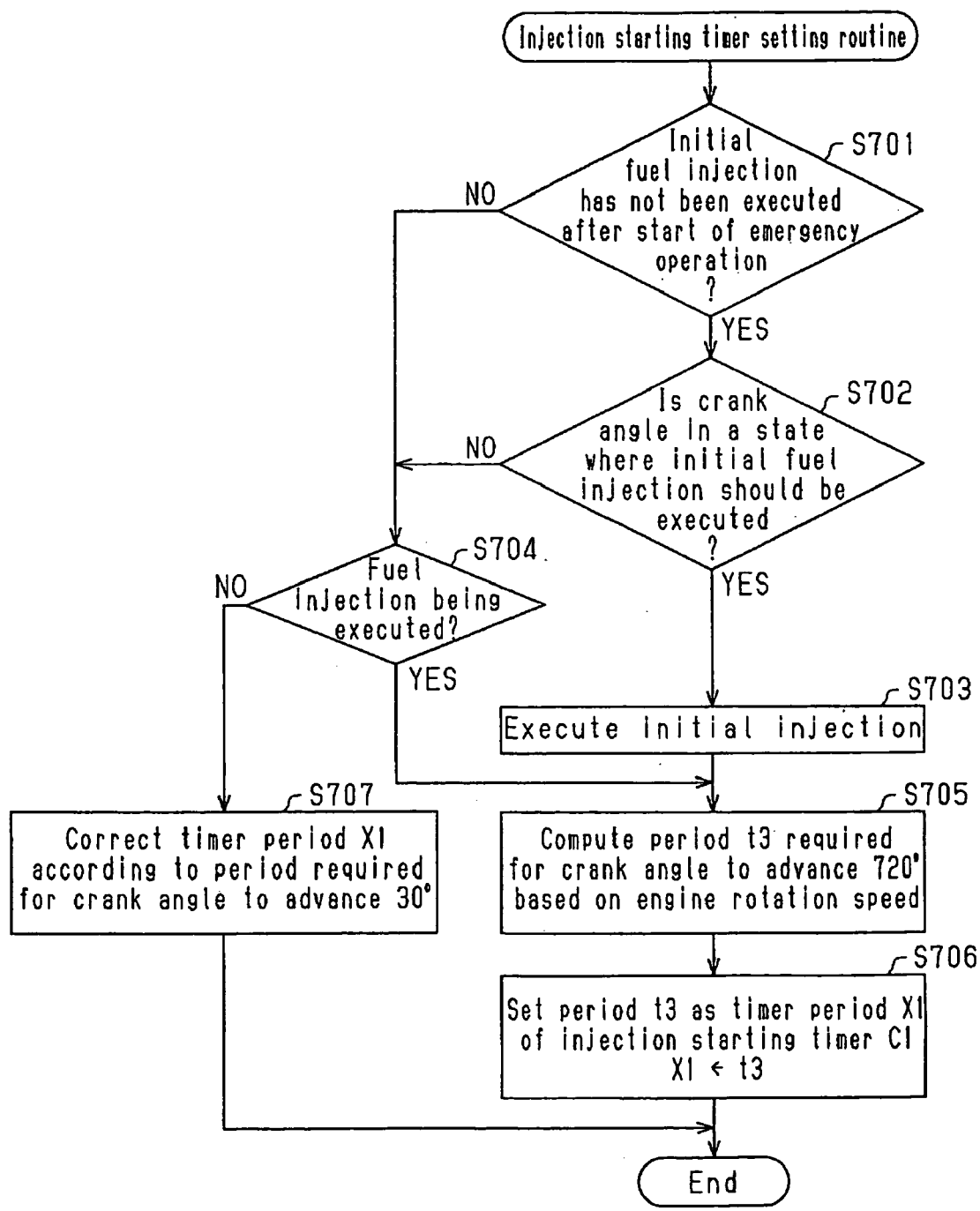
FIG. 9 is a flowchart showing a procedure for setting a timer period of the injection starting timer used in a fuel injection control for emergency operation.

FIG. 9 is a flowchart showing an injection starting timer setting routine for setting the timer period X1 of the injection starting timer C1 as a timer period for a starting control of the fuel injection in the emergency operation. When the crank position sensor 14 malfunctions, the injection starting timer setting routine, which is an emergency control process, is executed as an interrupt by the engine control computer 11, for example, every 30° of crank angle instead of the injection starting timer setting routine of FIG. 5. The execution timing at every 30° of crank angle in the injection starting timer setting routine in FIG. 9 is determined based on the rotational pulse train from the motor driver 12.

In the injection starting timer setting routine, an initial injection process (S701 to S703) is executed for executing the first fuel injection after the fuel injection control for the emergency operation is started. Specifically, if it is determined that fuel injection has not been executed after the fuel injection control for the emergency operation was started (YES at S701), the process proceeds to step S702. If in this state the crank angle is in a state where the first fuel injection should be executed, for example, if the crank angle is at the exhaust top dead center (YES at S702), fuel injection of an amount of fuel required for the emergency operation is executed from the fuel injection valve 3 (S703). If the first fuel injection after the fuel injection control for the emergency operation is started is executed, the decision outcome at S701 in the next cycle will be negative, and the process will proceed to step S704.

At step S704, whether fuel injection is being executed is determined. If the decision outcome is positive, the period required for the crank angle to advance one cycle of the engine 1 (720° CA) is computed. A timer setting process (S705, S706) for setting the computed period as the timer period X1 of the injection starting timer C1 is executed. Specifically, a period t3 required for the crank angle to advance 720° CA is computed (S705) based on the engine rotation speed. The computed period t3 is set as the timer period X1 of the injection starting timer C1 (S706).

The engine rotation speed used at step S705 is obtained based on the rotation pulse train from the motor driver 12. The timer period X1 of the injection starting timer C1 set at step S706 is caused to seek zero by the engine control computer 11 as time elapses. When the timer period X1 becomes zero through the injection execution routine of FIG. 4, fuel injection from the fuel injection valve 3 is started. Thereafter, the fuel injection is continued until a sufficient amount of fuel for the emergency operation is injected.

If it is determined that the fuel injection is not being executed at step S704, a timer period correction process (S707) is executed in which the timer period X1 set at step S706 is corrected based on the period required for the crank angle to advance predetermined degrees (engine rotation speed), and the timer period X1 is maintained to an appropriate value when the engine rotation speed changes. Specifically, during fuel injection, the timer period X1 for the next fuel injection is set (S706). After such setting and fuel injection (NO at S704), the timer period X1 is corrected in accordance with the length of period required for the crank angle to advance 30° (S707). Through the correction, the timer period X1 is decreased as the period is shortened, and the timer period X1 is increased as the period is extended.

Since the crank position sensor 14 is malfunctioning, the period required for the crank angle to advance 30° used at step S707 is obtained based on the rotation pulse train from the motor driver 12. If the period is obtained based on the pseudo signal described above, an abrupt change in the engine rotation speed can cause the period to be inappropriate as a value corresponding to 30° of crank angle, and the timer period X1, which is corrected based on the period, can be inappropriate. However, the intervals of the rising edges and the falling edges of the rotation pulse train from the motor driver 12 correspond to changes in the engine rotation speed. As a result, the period required for the crank angle to advance 30° based on the rotation pulse train corresponds to the engine rotation speed. Therefore, by correcting the timer period X1 based on changes of the required period, in other words, based on changes in the intervals of the rotation pulse train, the timer period X1 is maintained to an appropriate value regardless of changes in the engine rotation speed.

An example of the procedure of the ignition timing control for the emergency operation will now be described with reference to FIG. 10. The ignition timing control for the emergency operation is executed at predetermined timing in each cycle of the engine 1, for example, every time the crank angle advances 720° after the first ignition at the compression top dead center, so that ignition required for the emergency operation is executed at the compression top dead center.

Figure 10:
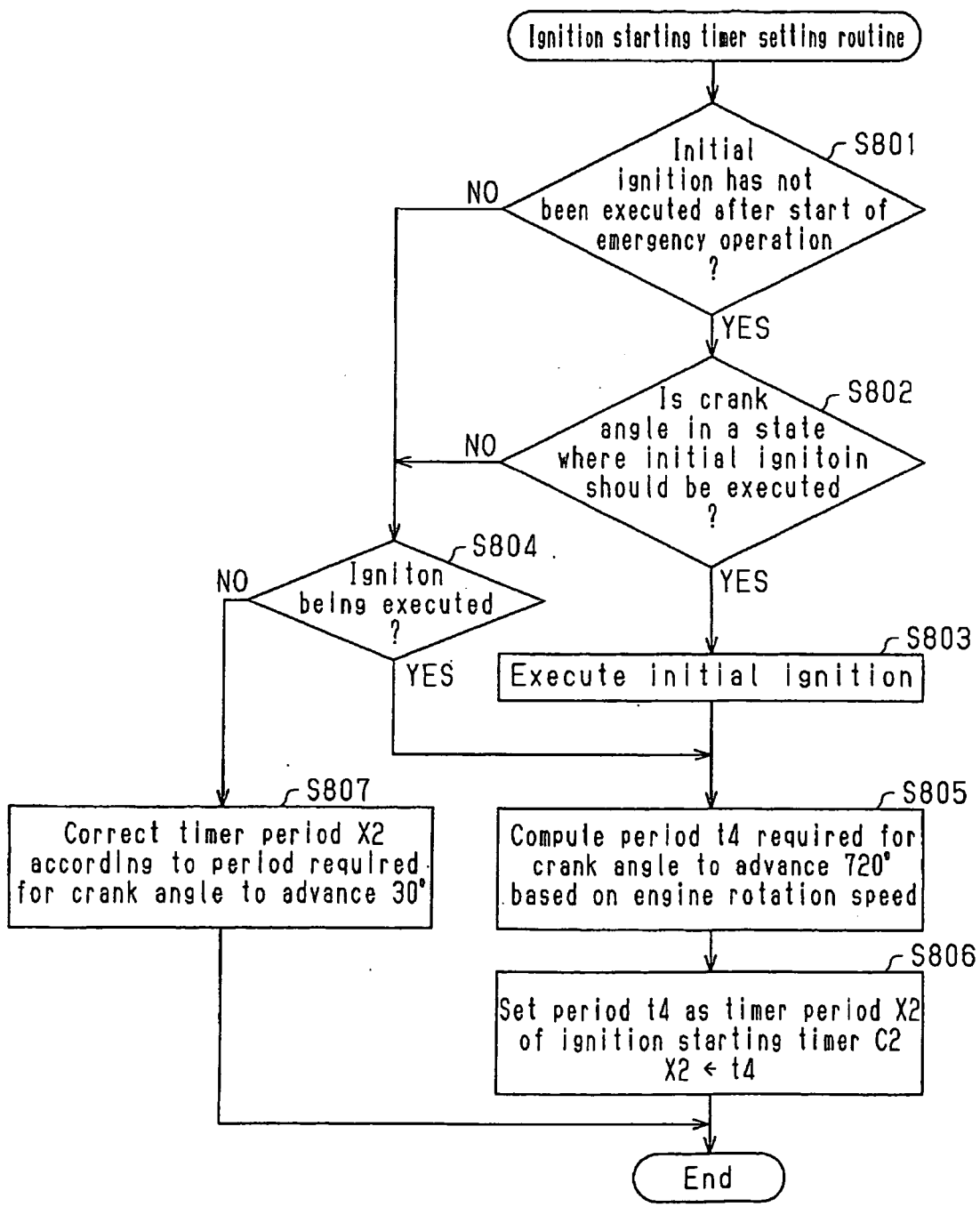
FIG. 10 is a flowchart showing a procedure for setting a timer period of an ignition starting timer used in an ignition timing control for emergency operation.

FIG. 10 is a flowchart showing an ignition starting timer setting routine for setting the timer period X2 of the ignition starting timer C2 as a timer period for a starting control of the supply of current to the ignition plug 5 in the emergency operation. When the crank position sensor 14 malfunctions, the ignition starting timer setting routine, which is an emergency control process, is executed as an interrupt by the engine control computer 11, for example, every 30° of crank angle instead of the ignition starting timer setting routine of FIG. 6. The execution timing at every 30° of crank angle in the injection starting timer setting routine in FIG. 10 is determined based on the rotational pulse train from the motor driver 12.

In the ignition starting timer setting routine, an initial ignition process (S801 to S803) is executed for executing the first ignition after the ignition timing control for the emergency operation is started. Specifically, if it is determined that ignition has not been executed after the ignition timing control for the emergency operation was started (YES at S801), the process proceeds to S802. If in this state the crank angle is in a state where the first ignition should be executed, for example, if the crank angle is at the compression top dead center (YES at S802), the supply of current to the ignition plug 5 for a predetermined period is executed (S803). If the first ignition after the ignition timing control for the emergency operation is started is executed, the decision outcome at S801 in the next cycle will be negative, and the process will proceed to step S804.

At step S804, whether ignition is being executed is determined. If the decision outcome is positive, the period required for the crank angle to advance one cycle of the engine 1 (720° CA) is computed. A timer setting process (S805, S806) for setting the computed period as the timer period X2 of the ignition starting timer C2 is executed. Specifically, a period t4 required for the crank angle to advance 720° CA is computed (S805) based on the engine rotation speed. The computed period t4 is set as the timer period X2 of the ignition starting timer C2 (S806).

The engine rotation speed used at step S805 is obtained based on the rotation pulse train from the motor driver 12. The timer period X2 of the injection starting timer C2 set at step S806 is caused to seek zero by the engine control computer 11 as time elapses. When the timer period X2 becomes zero through the ignition execution routine of FIG. 7, the supply of current to the ignition plug 5 is started. Thereafter, the supply of current is continued until a predetermined period has elapsed.

If it is determined that the ignition is not being executed at step S804, a timer period correction process (S807) is executed in which the timer period X2 set at step S806 is corrected based on the period required for the crank angle to advance predetermined degrees (engine rotation speed), and the timer period X2 is maintained to an appropriate value when the engine rotation speed changes. Specifically, during ignition, the timer period X2 for the next ignition is set (S806). After such setting and ignition (NO at S804), the timer period X2 is corrected in accordance with the length of period required for the crank angle to advance 30° (S807). Through the correction, the timer period X2 is decreased as the period is shortened, and the timer period X2 is increased as the period is extended.

Since the crank position sensor 14 is malfunctioning, the period required for the crank angle to advance 30° used at step S807 is obtained based on the rotation pulse train from the motor driver 12. If the period is obtained based on the pseudo signal described above, an abrupt change in the engine rotation speed can cause the period to be inappropriate as a value corresponding to 30° of crank angle, and the timer period X2, which is corrected based on the period, can be inappropriate. However, the intervals of the rising edges and the falling edges of the rotation pulse train from the motor driver 12 correspond to changes in the engine rotation speed. As a result, the period for the crank angle to advance 30° based on the rotation pulse train corresponds to the engine rotation speed. Therefore, by correcting the timer period X2 based on changes of the required period, in other words, based on changes in the intervals of the rotation pulse train, the timer period X2 is maintained to an appropriate value regardless of changes in the engine rotation speed.

The second embodiment has the following advantages.

(5) When the crank position sensor 14 malfunctions, the emergency operation of the engine 1, which is a control for operating the engine 1, is executed at every advancement of 300 CA using the rotation pulse train, which is outputted from the motor driver 12 as the output shaft 10*a* of the motor 10 rotates, which output shaft 10*a* rotates integrally with the intake camshaft 7. Since the intervals at which the rising edges and the falling edges of the rotation pulse train repeat changes in accordance with changes in the rotation speed of the intake camshaft 7 due to changes in the engine rotation speed, the intervals of the rising and falling edges are maintained to intervals at which the emergency control process should be executed, or the intervals corresponding to the 30° of crank angle, despite abrupt changes in the engine rotation speed. Therefore, the emergency control process is executed at appropriate timing (every 30° of crank angle) despite abrupt changes in the engine rotation speed by executing the emergency process at the timing of the rising and falling edges of the rotation pulse train based on the rotation pulse train.

(6) In each of the timer setting process in the control process (emergency control process) for the fuel injection control of the emergency operation, and the timer setting process in the control process (emergency control process) for the ignition timing control for the emergency operation, the timer period X1 of the injection starting timer C1 and the timer period X2 of the ignition starting timer C2 are set. After the timer periods X1, X2 are set, if the engine rotation speed abruptly changes, the timer periods X1, X2 can have inappropriate values. Therefore, to maintain the timer periods X1, X2 to appropriate values when the engine rotation speed changes, the timer period correction process for correcting the timer periods X1, X2 is executed based on the period required for the crank angle to advance 30°. When the crank position sensor 14 malfunctions, if the period required for the crank angle to advance 30° is obtained based on the pseudo signal, an abrupt change of the engine rotation speed causes the period to be inappropriate as a value corresponding to the 30° of crank angle. However, the period is obtained based on the rotation pulse train from the motor driver 12 during the emergency control process. The intervals of the rotation pulse trains correspond to the engine rotation speed even after such an abrupt change in the engine rotation speed. Therefore, by correcting the timer periods X1, X2 based on changes of the period obtained based on the rotation pulse train, the timer periods X1, X2 are maintained to appropriate values regardless of changes in the engine rotation speed.

(7) The same advantage as the advantage (4) of the first embodiment is obtained.

The above described embodiments may be modified as follows.

In the first embodiment, when the crank position sensor 14 malfunctions, the same control process as that of the normal state is executed as a control process for controlling the operation of the engine 1. However, a control process designed for abnormal states may be executed. In this case, the intervals of the rising edges and the falling edges of the rotation pulse train outputted from the motor driver 12 do not need to be the same as the execution intervals of the control processes in the normal state (30° of crank angle).

In the second embodiment, the intervals of the rising edges and the falling edges of the rotation pulse train outputted from the motor driver 12 are the same as the execution intervals of the control processes in the normal state (30° of crank angle) for controlling the operation of the engine 1. However, the intervals of the rising edges and the falling edges of the rotation pulse train may be changed as necessary.

In the first and second embodiments, the present invention is applied to the control processes for the fuel injection control and the ignition timing control. However, the present invention may be applied to other control processes for operating the engine 1.

In the first and second embodiments, a rotating electrical machine coupled to a crankshaft and a camshaft is exemplified by the electric motor 10 of the variable valve timing mechanism 9. The present invention is not limited to this configuration. For example, a generator is typically coupled to an engine crankshaft. The generator may be used as the rotating electrical machine. In the engine mounted on a hybrid automobile, a motor is coupled to the crankshaft to assist the engine. Such a motor of a hybrid automobile may be used as the rotating electrical machine.

Therefore, the present examples and embodiments are to be considered as illustrative and not restrictive and the invention is not to be limited to the details given herein, but may be modified within the scope and equivalence of the appended claims.

The invention claimed is:

1. A control apparatus for an internal combustion engine, wherein the engine includes a crankshaft, a camshaft for actuating a valve of the engine, a crank position sensor that outputs a crank signal every time the crankshaft rotates a predetermined crank angle, a rotating electrical machine that is coupled to one of the crankshaft and the camshaft, and a computer that, based on the crank signal from the crank position sensor, controls the engine every time the crankshaft rotates a predetermined crank angle,
   wherein the rotating electrical machine includes a rotor and a plurality of rotation sensors, each sensor outputting a signal corresponding to induced voltage generated by rotation of the rotor,
   wherein the computer controls the rotating electrical machine based on the signals from the rotation sensors, and wherein, when the crank position sensor malfunctions, the computer controls the engine every time the crankshaft rotates a predetermined crank angle based not on the crank signal but on a rotation pulse train generated based on the signals from the rotation sensors.

2. The apparatus according to claim 1, wherein a pulse interval of the rotation pulse train is set equal to an interval at which the computer normally executes a process for controlling the engine.

3. The apparatus according to claim 2, wherein the rotation sensors include three rotation sensors, each sensor outputting a signal that repeats rising edges and falling edges every 90° of crank angle, and wherein the signals are displaced by 60° of crank angle from one another.

4. The apparatus according to claim 3, wherein the engine further includes a driver for driving the rotating electrical machine, and wherein the driver combines outputs from the three rotation sensors to generate a signal that repeats rising edges and falling edges every 30° of crank angle, and outputs the generated signal to the computer.

5. The apparatus according to claim 1,
   wherein, at predetermined timing, the computer sets a time for driving a controlled subject of the engine based on a crank angle obtained from the rotation pulse train,
   wherein, when the time for driving the controlled subject is set, the computer computes a period until the driving time and sets the computed period in a timer, and
   wherein, when the crank position sensor malfunctions after the period is set in the timer, the computer corrects the period based on changes in the pulse interval of the rotation pulse train, and drives the controlled subject when the corrected period has elapsed.

6. The apparatus according to claim 1, wherein the engine includes a variable valve timing mechanism that changes a relative rotation phase between the camshaft and the crankshaft, wherein the rotating electrical machine is an electric motor coupled to the camshaft, and wherein the computer changes the relative rotation phase through control of the electric motor.

7. A control apparatus for an internal combustion engine, wherein the engine includes a crankshaft, a camshaft for actuating a valve of the engine, a crank position sensor that outputs a crank signal every time the crankshaft rotates a predetermined crank angle, a rotating electrical machine that is coupled to one of the crankshaft and the camshaft, and a computer that, based on the crank signal from the crank position sensor, controls the engine every time the crankshaft rotates a predetermined crank angle,
   wherein the rotating electrical machine includes a rotor and a plurality of rotation sensors, each sensor outputting a signal corresponding to induced voltage generated by rotation of the rotor,
   wherein the computer controls the rotating electrical machine based on signals from the rotation sensors, and wherein, when the crank position sensor malfunctions, the computer executes an emergency operation of the engine based on a rotation pulse train generated based on the signals from the rotation sensors.

8. The apparatus according to claim 7,
   wherein, when a controlled subject of the engine is driven in the emergency operation, the computer computes a period required for the crank angle to advance one cycle of the engine and sets the computed period in a timer, and
   wherein, after the period is set in the timer, the computer corrects the period based on changes in the pulse interval of the rotation pulse train, and drives the controlled subject when the corrected period has elapsed.

9. The apparatus according to claim 7, wherein the engine includes a variable valve timing mechanism that changes a relative rotation phase between the camshaft and the crankshaft, wherein the rotating electrical machine is an electric motor coupled to the camshaft, and wherein the computer changes the relative rotation phase through control of the electric motor.

10. A method for controlling an internal combustion engine, the engine having a crankshaft, a camshaft for actuating a valve of the engine, a rotating electrical machine that is coupled to one of the crankshaft and the camshaft, the method comprising:

outputting a crank signal from a crank position sensor every time the crankshaft rotates a predetermined crank angle;

controlling the engine based on the crank signal from the crank position sensor at every predetermined crank angle;

outputting, from a plurality of rotation sensors, signals corresponding to induced voltage generated by rotation of a rotor of the rotating electrical machine;

controlling the rotating electrical machine based on the signals from the rotation sensors; and controlling, when the crank position sensor malfunctions, the engine at every predetermined crank angle based not on the crank signal but on a rotation pulse train generated based on the signals from the rotation sensors.

11. The method according to claim 10, wherein a pulse interval of the rotation pulse train is set equal to an interval at which a process for controlling the engine is normally executed.

12. The method according to claim 11, wherein the rotation sensors include three rotation sensors, wherein each sensor is caused to output a signal that repeats rising edges and falling edges every 90° of crank angle, and wherein the signals are outputted while being displaced by 60° of crank angle from one another.

13. The method according to claim 12, further comprising combining outputs from the three rotation sensors to generate a signal that repeats rising edges and falling edges every 30° of crank angle.

14. The method according to claim 10, further comprising:

setting, at predetermined timing, a time for driving a controlled subject of the engine based on a crank angle obtained from the rotation pulse train;

computing, when the time for driving the controlled subject is set, a period until the driving time, and setting the computed period in a timer;

correcting, when the crank position sensor malfunctions after the period is set in the timer, the period based on changes in the pulse interval of the rotation pulse train; and driving the controlled subject when the corrected period has elapsed.

15. The method according to claim 10, wherein the engine includes a variable valve timing mechanism that changes a relative rotation phase between the camshaft and the crankshaft, wherein the rotating electrical machine is an electric motor coupled to the camshaft, and wherein the relative rotation phase is changed through control of the electric motor.

* * * * *